United States Patent
Kotake et al.

(10) Patent No.: US 7,120,313 B2
(45) Date of Patent: Oct. 10, 2006

(54) IMAGE PROCESSING APPARATUS AND METHOD FOR PRODUCING A VIRTUAL SPACE FOR WALK-THROUGH

(75) Inventors: Daisuke Kotake, Kanagawa (JP); Akihiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 09/818,605

(22) Filed: Mar. 28, 2001

(65) Prior Publication Data

US 2002/0126913 A1    Sep. 12, 2002

(30) Foreign Application Priority Data

Mar. 7, 2001    (JP) .............. 2001/063922

(51) Int. Cl.
    *G06K 9/20*    (2006.01)
(52) U.S. Cl. ...................... 382/282; 382/284
(58) Field of Classification Search ............... 382/282, 382/284

See application file for complete search history.

(56) References Cited

U.S. PATENT DOCUMENTS

| | | | | |
|---|---|---|---|---|
| 5,517,419 A | * | 5/1996 | Lanckton et al. ............ | 701/216 |
| 6,011,558 A | * | 1/2000 | Hsieh et al. ................ | 345/629 |
| 6,075,559 A | * | 6/2000 | Harada ....................... | 348/148 |
| 6,266,442 B1 | * | 7/2001 | Laumeyer et al. .......... | 382/190 |
| 6,268,825 B1 | * | 7/2001 | Okada .................... | 342/357.13 |
| 6,282,245 B1 | * | 8/2001 | Oishi et al. ............ | 375/240.28 |
| 6,335,754 B1 | * | 1/2002 | Endo et al. .................. | 348/37 |
| 6,512,857 B1 | * | 1/2003 | Hsu et al. ................... | 382/294 |
| 6,587,601 B1 | * | 7/2003 | Hsu et al. ................... | 382/294 |
| 2002/0070958 A1 | * | 6/2002 | Yeo et al. .................. | 345/723 |

FOREIGN PATENT DOCUMENTS

| | | |
|---|---|---|
| JP | 11-027657 | 1/1999 |
| JP | 11-168754 | 6/1999 |
| JP | 0 977 014 A2 * | 2/2000 |

OTHER PUBLICATIONS

"Building image-Based Cybercities by Using Vehicle-Mounted Cameras", M. Hirose, et al., Proceedings of the Virtual Reality Society of Japan Second Annual Conference, pp. 67-70, 2997; and. "Generation of Wide-Range Virtual Environment by Using Photorealistic Images", T. Endo, et al., published by Shingaku Society, PA-3-4, pp. 276-277, 1997.

Building Image-Based Cybercites by Using Vehicle-Mounted Cameras, T. Endo, et al. published by Shingaku Society, PA-3-4 pp. 276-277, 1997.

Generation of Wide-Range Virtual Environment by Using Photorealistic Images, M. Hirose, et al., Proceedings of the Virtual Reality Society of Japan Second Annual Conference, pp. 67-70, 1997.

* cited by examiner

*Primary Examiner*—Bhavesh M. Mehta
*Assistant Examiner*—Patrick L. Edwards
(74) *Attorney, Agent, or Firm*—Fitzpatrick, Cella, Harper & Scinto

(57) ABSTRACT

Plural pieces of frame data are generated and held based on image data obtained by capturing images while moving a plurality of capture devices for capturing images in different directions. A frame data group containing consecutive pieces of frame data determined to have been captured at practically the same position can be extracted from the plural pieces of held frame data. Frame data is deleted from the extracted frame data such that one piece of frame data can exist as the data captured at one position. Thus, when the frame data corresponding to a plurality of positions on a map is stored, thinned frame data is stored after being associated with the corresponding position on the map. Therefore, when virtual space in a walk-through system is designed using an IBR technology, panoramic images for reproduction of the virtual space can be efficiently generated and held.

4 Claims, 14 Drawing Sheets

FIG.6

POSITION DATA (GPS MEASUREMENT RESULT DATA)

| TIME CODE | POSITION(θ) | POSITION(φ) |
|---|---|---|
| 00:00:00:01 | 135.000 | 35.000 |
| 00:00:00:02 | 135.002 | 35.001 |
| 00:00:00:03 | 135.004 | 35.002 |
| 00:00:00:04 | 135.005 | 35.002 |
| ... | ... | |
| 00:00:00:10 | 135.010 | 35.008 |

VIDEO DATA

| TIME CODE | FRAME NUMBER | FRAME DATA |
|---|---|---|
| 00:00:00:01 | 000001 | |
| 00:00:00:02 | 000002 | |
| 00:00:00:03 | 000003 | |
| 00:00:00:04 | 000004 | |
| : | : | |
| 00:00:00:10 | 000010 | |

IMAGE PROCESSING APPARATUS AND METHOD FOR PRODUCING A VIRTUAL SPACE FOR WALK-THROUGH

FIELD OF THE INVENTION

The present invention relates to an image processing apparatus and method for representing virtual space based on image data obtained by capturing real space.

BACKGROUND OF THE INVENTION

Technology of capturing real space using a capture device mounted on a moving object, and representing the captured real space as virtual space using a computer based on the captured image data is proposed (for example, 'Building Image-Based Cybercities by Using Vehicle-Mounted Cameras' by Endo, Katayama, Tamura, Hirose, Watanabe, and Tanigawa (published by Shingaku Society, PA-3-4, pp. 276–277, in 1997), 'Building Image-Based Cybercities by Using Vehicle-Mounted Cameras(2)—Generation of Wide-Range Virtual Environment by Using Photorealistic Images —' by Hirose, Watanabe, Tanigawa, Endo, Katayama, and Tamura (published in Proceedings of the Virtual Reality Society of Japan Second Annual Conference, pp. 67–70, in 1997), etc.

A method for representing real space captured as virtual space based on the captured image data captured by the capture device mounted on a moving object can be a method of reconstructing a geometric model of real space based on captured image data, and representing it in the conventional CG technology. However, the technology is limited in correctness, precision, reality, etc. of a model. On the other hand, the image-based rendering (IBR) technology of representing virtual space using a captured image without using a model has recently attracted attention. The IBR technology produces an image from any viewpoint based on a plurality of captured images. Since the IBR technology uses captured images, realistic virtual space can be represented.

To produce walk-through system of virtual space using the above mentioned IBR technology, it is necessary to produce and present an image depending on the position in the virtual space of a user. In this type of system, each frame of captured image data is associated and stored with the position in the virtual space, the corresponding frame is obtained based on the position and the view direction of the user in the virtual space, thereby reproducing the frames.

As a common method of obtaining the position data in the real space, the position measurement system using an artificial satellite represented by the GPS (Global Positioning System) which is also used for a car navigation system, etc. can be used. A method of associating the position data obtained in the GPS with the captured image data can use a time code (Japanese Patent Publication Laid-open No. 11-168754). In this method, each frame of captured image data can be associated with position data by associating the time data contained in the position data with the time code added to each frame of captured image data.

In the walk-through presentation in the above mentioned virtual space, a user can see a desired direction from his or her viewpoint. Therefore, an image at each viewpoint is stored as a panoramic image covering a range wider than an image to be reproduced, a partial image to be reproduced is cropped and displayed from the panoramic image based on the position and the view direction of the user in the virtual space.

However, when a real city's view is captured by a capture device mounted on a vehicle as a moving object, image data of the same physical point is captured for a plurality of frames due to the condition of a traffic signal, the traffic jam, etc. Therefore, collected captured image data can contain a larger number of panoramic images at the same point. This apparently causes data overlapping. For example, wasteful panoramic images can be stored when a database of panoramic images are generated to represent virtual space. Furthermore, this also indicates wasting resources of storage media such as a hard disk, etc.

SUMMARY OF THE INVENTION

The present invention has been achieved to solve the above mentioned problems, and aims at efficiently producing and storing panoramic images for reproducing virtual space in presenting walk-through system of virtual space using an IBR technology.

An image processing apparatus according to the present invention for attaining the above mentioned purpose has the following configuration. That is, the apparatus includes:

holding means for holding plural pieces of frame data obtained from the image data input while visiting a plurality of positions;

extraction means for extracting frame data determined to have been captured at practically a same position from the plural pieces of frame data held by the holding means;

deletion means for deleting frame data overlapping another piece of frame data extracted by the extraction means; and storage means for storing, after associating with the position on a map, frame data remaining after the deleting process performed by the deletion means.

Furthermore, an image processing method for attaining the above mentioned purpose according to the present invention includes the following steps. That is, the method includes:

extracting step for extracting frame data determined to have been captured at practically the same position obtained from the holding means which holds plural pieces of frame data obtained from the image data captured by a plurality of capture devices;

deleting step for deleting frame data overlapping another piece of frame data extracted in the extracting step; and storing step for storing, after associating with the position on a map, frame data remaining after performing the deleting process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of the state of storing video data and position data (GPS measurement result data) stored in the image data storage unit 10;

DETAILED DESCRIPTION OF THE PREFERRED EMBODIMENTS

Preferred embodiments of the present invention will now be described in detail in accordance with the accompanying drawings.

[First Embodiment]

Described first is a walk-through system of virtual space according to the present embodiment. According to the present embodiment, panoramic image data is generated from captured image data obtained by a plurality of capture devices mounted on a moving object such as a vehicle, etc., and the panoramic image data is stored after associated with the map data indicating the position in the real space. Then, depending on the position and the view direction of the user in the virtual space, a display image is produced from the stored panoramic image data, thereby realizing walk-through in the virtual space.

Figure 1:
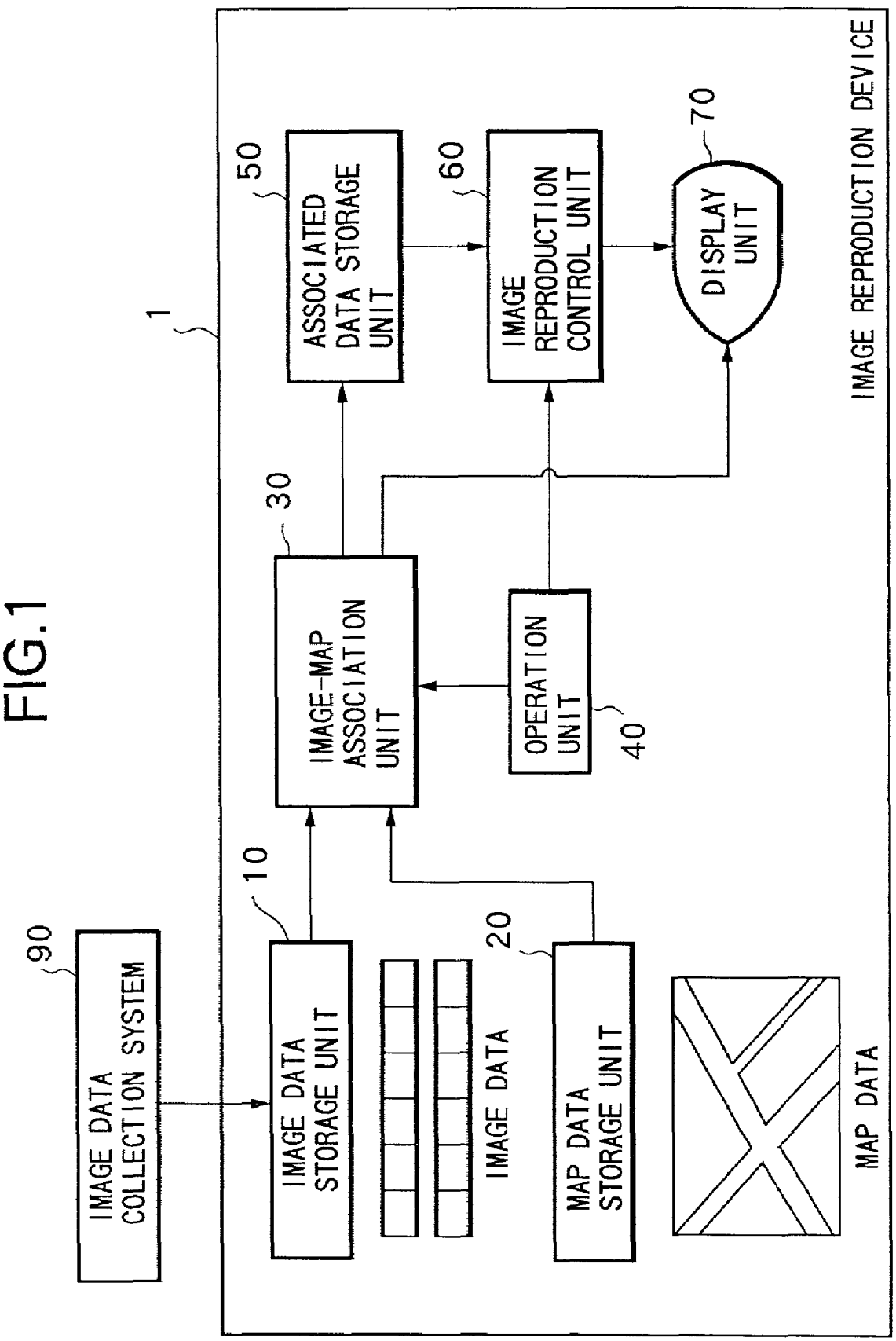
FIG. 1 is a block diagram of a configuration showing a function of a walk-through system according to an embodiment of the present invention.

FIG. 1 is a block diagram of the configuration showing the function of the walk-through system according to the present embodiment. The walk-through system comprises an image data collection system 90 and an image reproduction device 1. The image reproduction device 1 comprises an image data storage unit 10, a map data storage unit 20, an image-map association unit 30, an operation unit 40, an associated data storage unit 50, an image reproduction control unit 60, and a display unit 70.

The image data storage unit 10 stores frame data as captured image data obtained by the image data collection system 90 described later. The map data storage unit 20 stores map data containing map image information and coordinate information for representation of each position on the map image using coordinates of longitude and latitude. The map data storage unit 20 stores at least the map data, captured by the image data collection system 90, in the range corresponding to the position in the real space of the frame data stored in the image data storage unit 10. The map data is stored in the hard disk, RAM or another external storage device not shown in the attached drawings.

The image-map association unit 30 generates panoramic image data at each view position from the frame data stored in the image data storage unit 10, and associates it with the map data stored in the map data storage unit 20. Thus, the associated panoramic image data and the map data are stored as the associated data in the associated data storage unit 50. The image-map association unit 30 generates a panoramic image from the frame data obtained by a plurality of capture devices at the same time, specifies corresponding map data (position data on the map) from the GPS information at the time, associates and stores them in the associated data storage unit 50. As described later, a time code is added to each piece of the frame data obtained from the GPS information and by the plurality of capture devices. According to the time code, frames of the same time and the GPS information are obtained.

The operation unit 40 is provided with a mouse, a keyboard, a joy stick, etc. In the image-map association unit 30, it is also possible to edit the association between the frame stored in the image data storage unit 10 and the map data stored in the map data storage unit 20 by an operation from the operation unit 40.

The image reproduction control unit 60 determines the position (on the map) and the view direction of the user according to the input of an operation from the operation unit 40, reads necessary image data from the data stored in the associated data storage unit 50, and generates image data to be displayed on the display unit 70.

Figure 2:
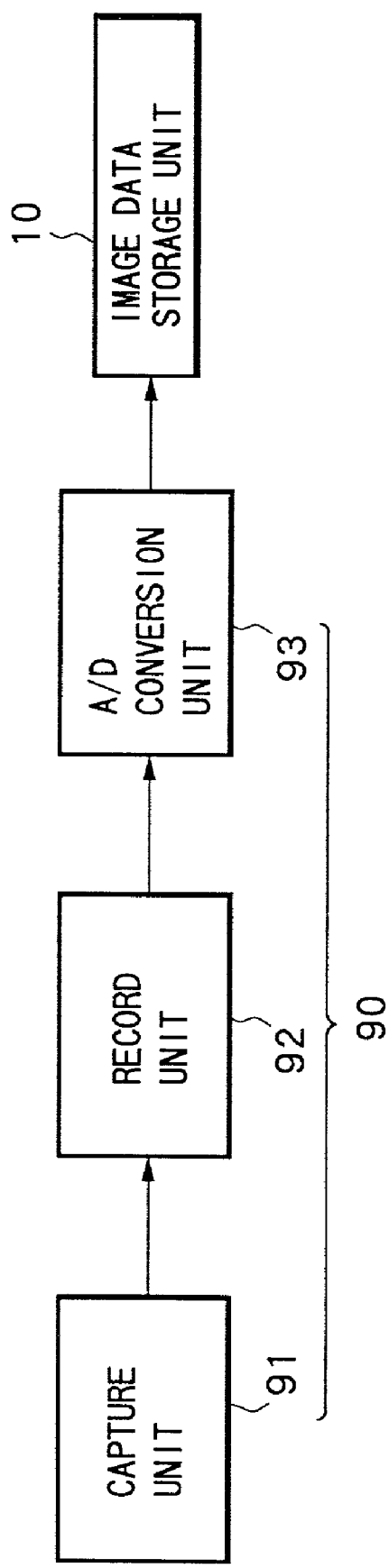
FIG. 2 shows an example of a configuration of an image data collection system 90 for collecting frame data stored in an image data storage unit 10.

FIG. 2 shows an example of the configuration of the image data collection system 90 for collecting the frame data stored in the image data storage unit 10. As shown in FIG. 2, the image data collection system 90 comprises a capture unit 91, a record unit 92, and an A/D conversion unit 93. Each unit is described below in detail by referring to FIGS. 3 through 5.

Figure 3:
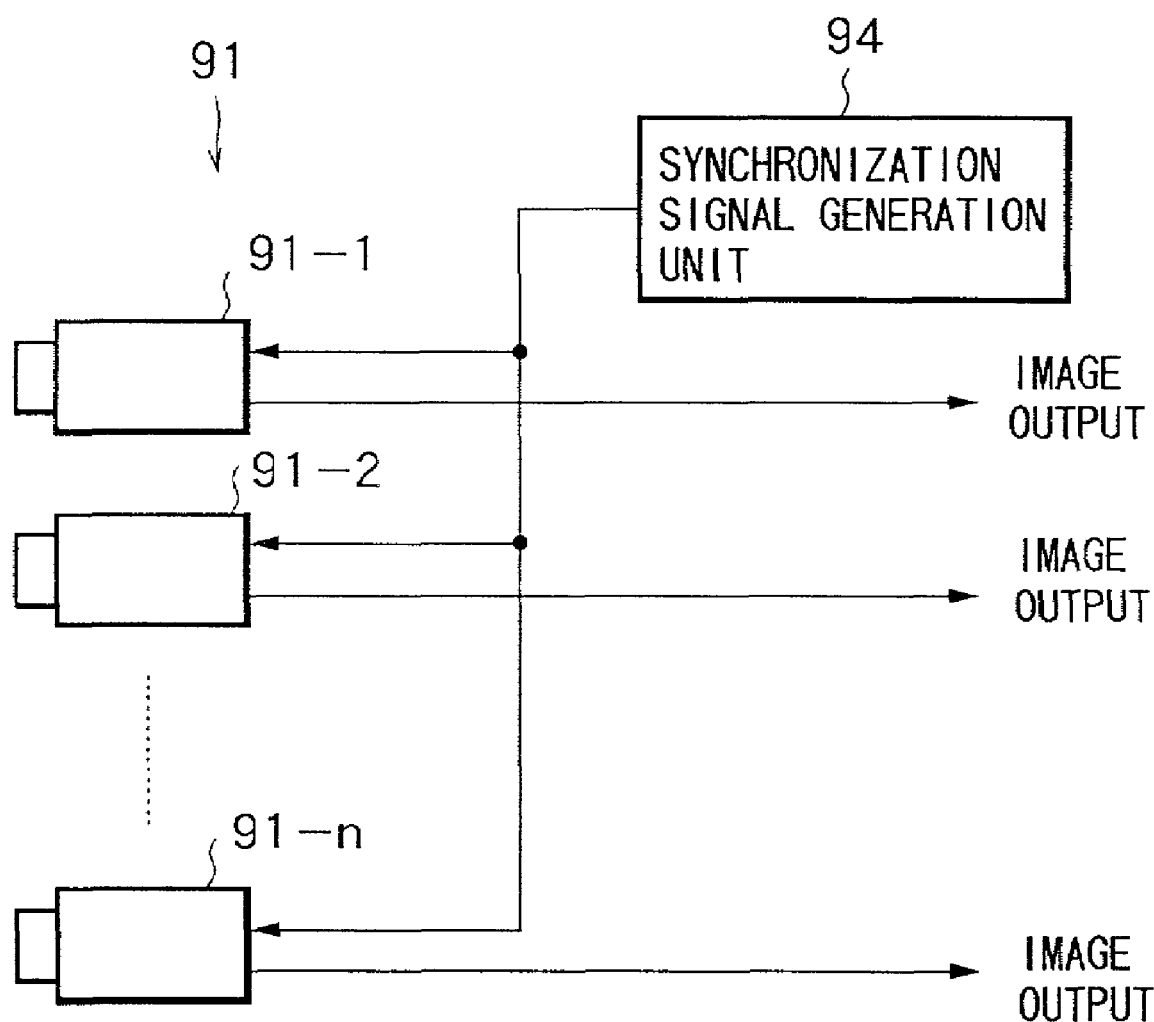
FIG. 3 is a block diagram showing in detail a configuration of a capture unit 91.

FIG. 3 is a block diagram of the detailed configuration of the capture unit 91. According to the present embodiment, the capture unit 91 is mounted on a moving object such as a vehicle, etc. The capture unit 91 comprises n (n≧1) video cameras (91-1 through 91-n) and a synchronization signal generation unit 94. Video cameras 91-1 through 91-n can receive an external synchronization signal from the synchronization signal generation unit 94. According to the present embodiment, the capturing timings of the n video cameras 91-1 through 91-n can match with one another using an external synchronization signal output from the synchronization signal generation unit 94.

Figure 4:
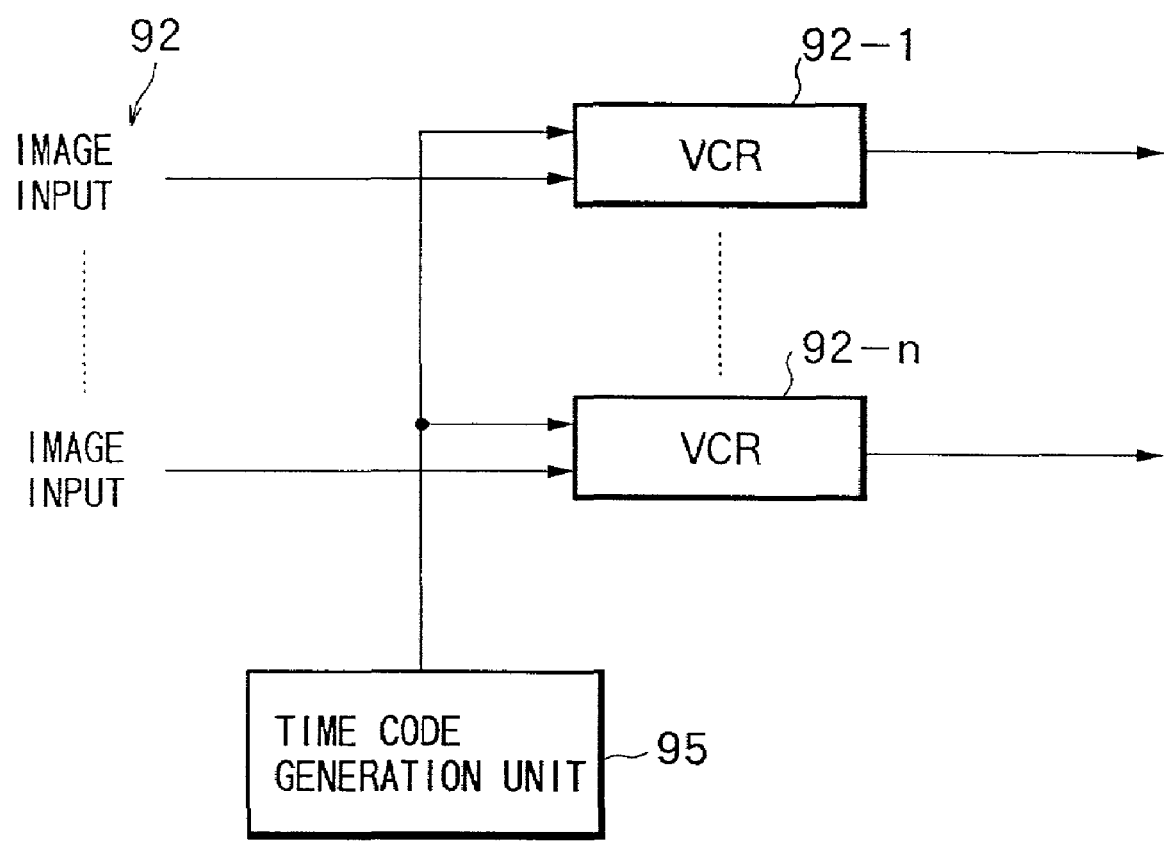
FIG. 4 is a block diagram showing in detail a configuration of a record unit 92.

FIG. 4 is a block diagram of the detailed configuration of the record unit 92. The record unit 92 comprises a time code generation unit 95 and record units (video cassette recorders VCR according to the present embodiment) 92-1 through 92-n corresponding to the video cameras 91-1 through 91-n. The output images from n video cameras 91-1 through 91-n of the capture unit 91 are input to the VCR 92-1 through 92-n respectively. The time code generation unit 95 provides a time code indicating a capturing time for each of the VCR 92-1 through 92-n. The VCR 92-1 through 92-n fetch the image input from the corresponding video camera and the time code from the time code generation unit 95, and record it as video data with the time code.

Figure 5:
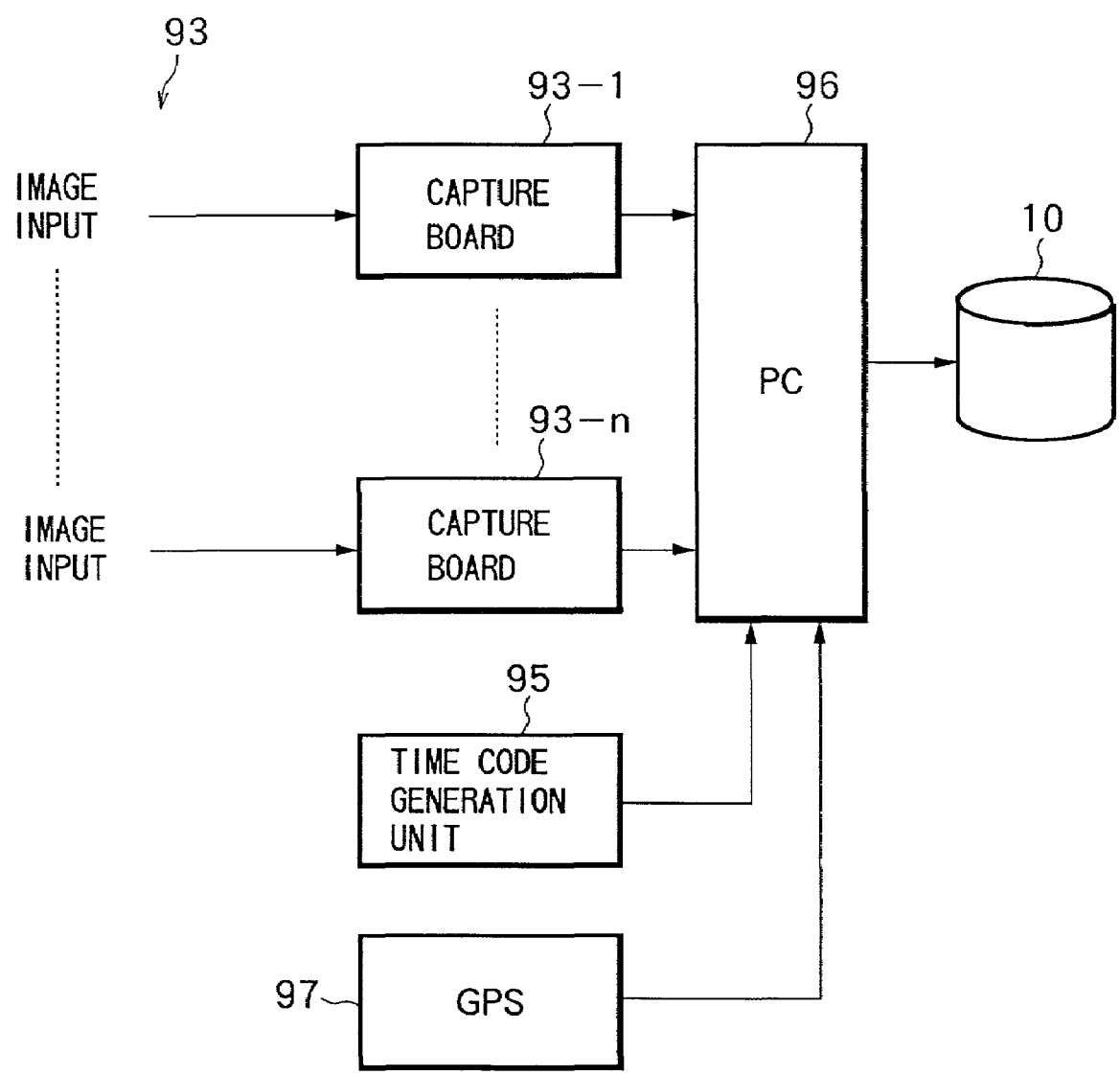
FIG. 5 is a block diagram showing in detail a configuration of an A/D conversion unit 93.

As described above, the image information collected in each of the VCR 92-1 through 92-n is converted into digital image data by the A/D conversion unit 93, and stored in the image data storage unit 10. FIG. 5 is a block diagram of the detailed configuration of the A/D conversion unit 93. The A/D conversion unit 93 comprises a personal computer (hereinafter referred to as a PC) 96, and video capture boards (hereinafter referred to as capture boards) 93-1 through 93-n respectively corresponding to the VCR 92-1 through 92-n. The capture boards are not always required for respective video cameras, but can be as many as each PC can include. The A/D conversion unit 93 converts analog image data provided from each VCR into digital image data (for example, in an AVI format), and stores the data in the image data storage unit 10 containing a hard disk, etc. or another storage medium connected to the PC 96.

In the present system, position data is obtained from a GPS 97 at a timing of the time code generation unit 95 generating a time code, and the obtained position data is associated with the time code at that time, and is then stored.

FIG. 6 shows an example of the state of storing video data and position data (GPS measurement result data) in the image data storage unit 10. As shown in FIG. 6, the image data storage unit 10 stores a frame to which a time code is added and position data to which a time code is added. Therefore, the frame and the position data are associated with each other through the time code. In FIG. 6, video data from only one video camera is shown, but the video data is output from the corresponding number (n) of video cameras as described above.

The computation of the three-dimensional position in the GPS is well known, and is not described in detail here. As described above, while images are captured by n video cameras, the latitude and longitude data P ($\theta$, $\phi$) sequentially obtained by the GPS is associated with the time code from a time code generation unit 72, and is then stored. Therefore, each frame of the video data can be associated with the latitude and longitude data obtained from the GPS through the time code.

When image data is fetched to the PC 96 through the capture boards 93-1 through 93-n, the capture start and end portions are determined according to recorded time codes such that the digital image data obtained through n VCR and capture boards can comprise the data of the same length and captured at the same time.

Figure 7:
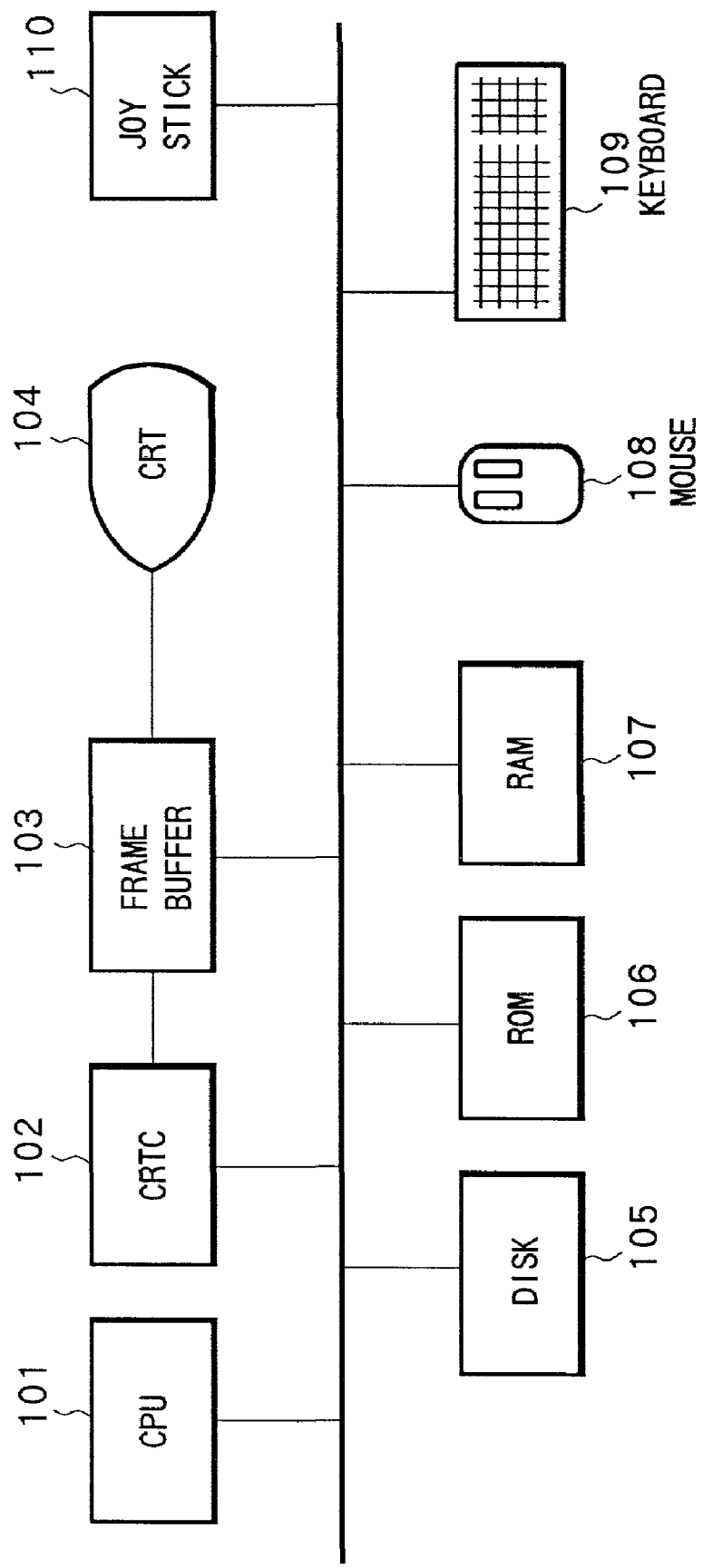
FIG. 7 is a block diagram of a configuration of a hardware of an image reproduction device 1 according to an embodiment of the present invention.

Described below is the image reproduction device 1. FIG. 7 is a block diagram of the configuration of the hardware of the image reproduction device 1 according to the present embodiment. The configuration of the hardware shown in FIG. 7 is similar to the configuration of a common personal computer. In FIG. 7, a disk 105 comprises the image data storage unit 10, and stores the frame data and position data obtained by the image data collection system 90 as described above by referring to FIGS. 2 through 6. The disk 105 comprises not only the above mentioned image data storage unit 10, but also the map data storage unit 20 and the associated data storage unit 50 shown in FIG. 1.

The CPU 101 functions as the image-map association unit 30 for associating image data with map data and storing them, or the image reproduction control unit 60 for reproducing an image based on the image data stored in the associated data storage unit 50 by executing a program stored in the disk 105, ROM 106 or an external storage device (not shown in the attached drawings).

By a CPU 101 issuing various display instructions to a display controller 102, the display controller 102 and a frame buffer 103 display desired data on a display unit 104. In FIG. 7, a CRTC is shown as the display controller 102, and a CRT is shown as the display unit 104. However, it is obvious that the display unit is not limited to a cathode-ray tube, but a liquid crystal display, etc. can be used. The display controller 102, the frame buffer 103, and the display unit 104 form the above mentioned display unit 70. A mouse 108, a keyboard 109, and a joy stick 110 are used to input an operation of a user to the image holding and reproduction device 1, and form the above mentioned operation unit 40.

Figure 8:
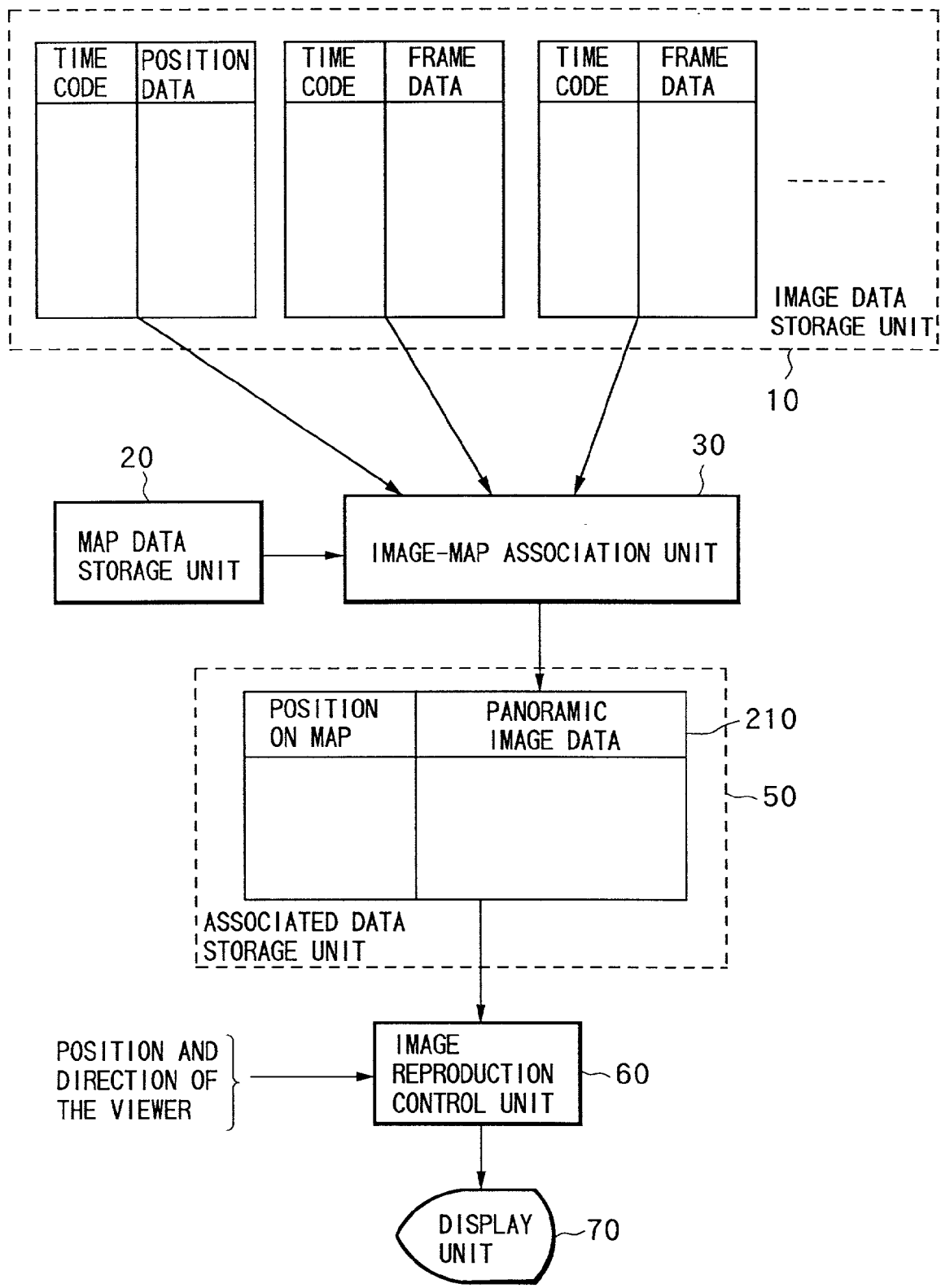
FIG. 8 shows contents of a process of the image reproduction device 1 in a walk-through system according to an embodiment of the present invention.

Described below is the outline of the operation of the image reproduction device 1 in the walk-through system according to the present embodiment with the above mentioned configuration. FIG. 8 shows the contents of the process of the image reproduction device 1 in the walk-through system according to the present embodiment.

By the above mentioned image data collection system 90, the image data storage unit 10 stores frame data with a time code based on the video data obtained by the n video cameras 91-1 through 91-n, and the position data with a time code based on the position data obtained by the GPS 97.

The image-map association unit 30 generates a panoramic image by combining frame data having the same time codes, and converts the position data corresponding to the time code by referring to the map data held by the map data storage unit 20 into the position on the map. Then, it generates associated data 210 obtained by the obtained panoramic image with the position on the map, and stores the result in the associated data storage unit 50.

The associated data storage unit 50 stores data as follows according to the present embodiment. That is, using a cross and a corner as a sectional point, a line enclosed by sectional points is defined as a road, an ID is assigned to each sectional point and road, and the ID is added to a corresponding frame. A frame group corresponding a road is assigned numbers in order from the leading frame.

Figure 9:
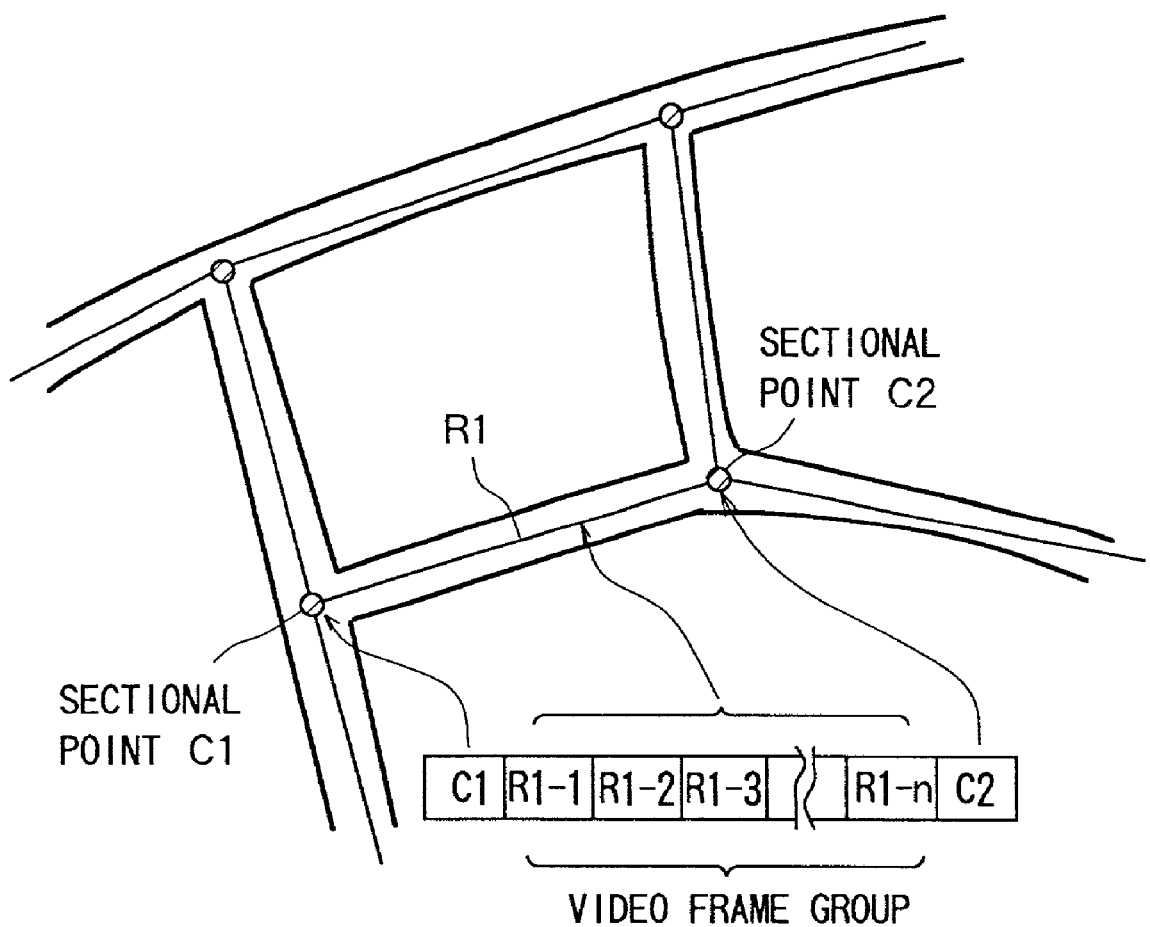
FIG. 9 shows frame data as a sectional point associated with a corresponding road on a map.

FIG. 9 shows the above mentioned process. In FIG. 9, a line enclosed by a sectional point having an ID of C1 and a sectional point having an ID of C2 is assigned an ID of R1. The correspondence between the IDs and the map is stored in the map data storage unit 20.

When a frame corresponding to the sectional points C1 and C2 are specified based on the GPS data, etc., the frame group enclosed by the frames corresponds to the road R1. In FIG. 9, there are n frames in the frame group. The frames corresponding to the sectional points C1 and C2 are assigned the IDs of C1 and C2 respectively, and each frame of the frame group is sequentially assigned R1-1 through R1-n.

The correspondence between a sectional point and a frame is automatically performed based on the GPS data. A user can also associate them by specifying a frame and a corresponding cross on the map while reproducing video data. In this case, the position of each frame of a frame group enclosed by sectional points can be assigned at an equal distance in a line connecting the sectional points (assigning n frames at the position of each division by equally dividing the line connecting C1 and C2 by n+1 in the above mentioned example), thereby configuring the system without the GPS.

Thus, the walk-through presentation is reproduced using the stored associated data. When the operation unit 40 performs a walk-through operation using the joy stick 110, etc., the position (on the road of the map) and the view direction of the user can be generated correspondingly. The image reproduction control unit 60 obtains an image to be displayed on the display unit 70 from the associated data 210 based on the generated position and the view direction of the user, and the corners of the image displayed on the display unit 70, and has the display unit 70 display the image. For example, when the user is looking in the 15° direction at the point a on the map, a partial image corresponding to the 15° direction of the panoramic image at the point a is extracted. Then, for the position and the view direction of the user sequentially determined as the position of the user on the map moves, the image reproduction control unit 60 obtains a displayed image as described above, and displays the obtained image on the display unit 70, thereby realizing the walk-through presentation.

In the above mentioned system, the image data collection system 90 captures an image data using the capture unit 91 having a plurality of cameras mounted on a moving object such as a vehicle, etc., and collects image data. Therefore, the images are captured while the vehicle is running on a common road. As a result, it is almost impossible to capture data while moving at a low speed. Especially, since the vehicle moves at a low speed by a stop according to a traffic signal, a traffic jam, etc., image data is collected with unnecessary frames containing a number of overlapping images. According to the present embodiment, these wasteful frames can be reduced, thereby efficiently generating and storing panoramic data.

The image-map association unit 30 according to the present embodiment first performs a thinning process in which unnecessary frames containing overlapping images captured at the same capturing position can be removed in the frames stored in the image data storage unit 10. After the thinning process, it generates a panoramic image using remaining frames, and stores it in the associated data storage unit 50. Described below is the thinning process according to the first embodiment of the present invention.

In the thinning process, the image data collected by the image data collection system 90 and stored in the image data storage unit 10 is checked whether or not the a frame obtained by one video camera is captured at the same position as the adjacent frame. If the frames are captured at the same position, the adjacent frame showing the image captured at the same position is deleted.

Figure 10:
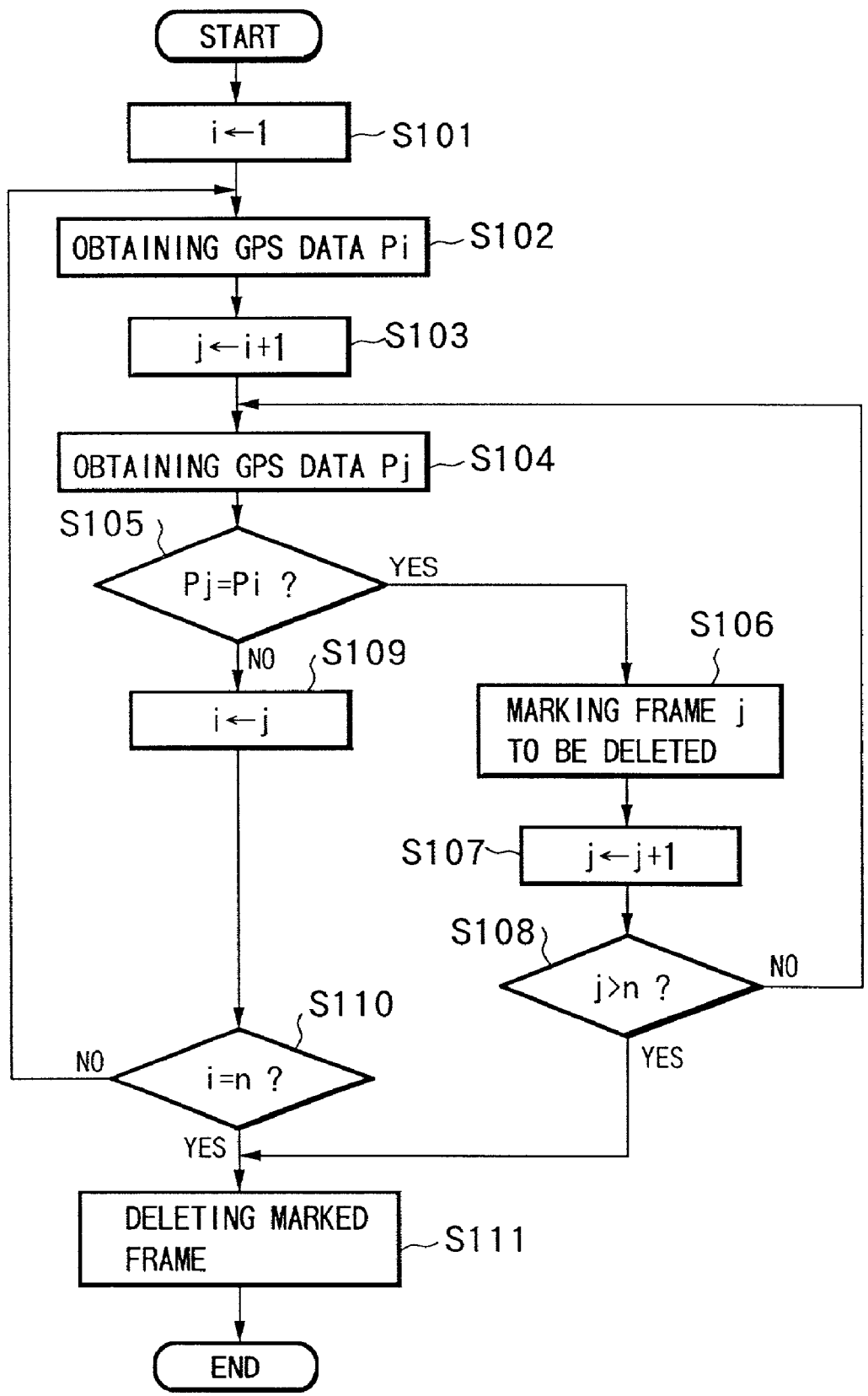
FIG. 10 is a flowchart of a thinning process according to a first embodiment of the present invention.

FIG. 10 is a flowchart of the thinning process according to the first embodiment of the present invention. First, in step S101, i indicating the position data to be checked (hereinafter referred to as the GPS data) is set to the initial value of 1. Then, in step S102, the i-th GPS data Pi is obtained from the image data storage unit 10 (that is, Pi is the GPS data corresponding to the frame i corresponding to the i-th time code). In step S103, j indicating the GPS data to be compared with the GPS data Pi is set to i+1, that is, set as the GPS data corresponding to the frame j adjacent to the frame i.

In step S104, the GPS data corresponding to the frame j (that is, the j-th GPS data) Pj is obtained from the image data storage unit 10, and Pi is compared with Pj in step S105. When they are equal to each other (Pi=Pj), then control is passed to step S106, and the j-th time code or the j-th GPS data is marked to delete the frame j. Then, in step S107, 1 is added to j to check the position of the adjacent frame. If j is equal to or smaller than n in step S108, then control is returned to step S104. In the above mentioned processes, a frame group containing a series of frames starting with the frame i, and captured at the same position is marked to be deleted. For example, if five consecutive frames (I1 through I5) are captured at the same position, then the GPS data of these five frames are the same as each other, and the corresponding GPS data or the time codes are provided with deletion marks to delete I2 through I5. If j is larger than n (the number of frames to be processed) in step S108, then the check terminates on all frames, thereby passing control to step S111.

On the other hand, if Pi is not equal to Pj in step S105, then control is passed to step S109, and the value of i is substituted for j. Then, if i is not n in step S110, then control is returned to step S102. Thus, it is checked whether or not each of all n frames has a frame group having consecutive frames captured at the same position. If yes, then overlapping frames are marked to be deleted.

Then, in step S111, all frames corresponding to the marked GPS data (or time codes) are deleted. Thus, from all frame sequences obtained from all cameras, overlapping image data captured at the same position can be deleted.

After deleting the overlapping frames, the image-map association unit 30 generates a panoramic image using remaining frames, associates the image with the data indicating the position on the map, and stores it in the associated data storage unit 50.

In the above mentioned processes, it is determined whether or not the frames are captured at the same position by checking whether or not the position data match each other (step S105). Although the data does not strictly match each other in consideration of the measurement error by the GPS, etc., the data can be recognized as matching each other when the difference (in distance) is in a predetermined range. In this case, it is determined in step S105 whether or not the following expression exists.

$$f(Pi, Pj) < \alpha$$

where f ( ) indicates a function for conversion of the GPS data represented by latitude and longitude into a distance value. Since the available arithmetic operation is clear to those skilled in the art, the detailed explanation is omitted here. Thus, a group of consecutive frames in the range of the position of $\alpha$ can be represented by the leading frame.

As described above, according to the first embodiment, in a group of consecutive frames recognized as captured at the same position based on the GPS data corresponding a frame, all data excluding one leading frame are deleted, thereby preventing wasteful processes performed in generating a panoramic image.

[Second Embodiment]

In the above mentioned first embodiment, the thinning process is performed by determining whether or not captured data have been captured at the same position based on the GPS data. According to the second embodiment, it is determined using speed data whether or not the captured data have been captured at the same position.

According to a second embodiment, in the A/D conversion unit 93 of the image data collection system 90 shown in FIG. 5, a speedometer replaces the GPS 97, and the measurement value is recorded in synchronization with the issue of a time code by the time code generation unit 95.

Figure 11:
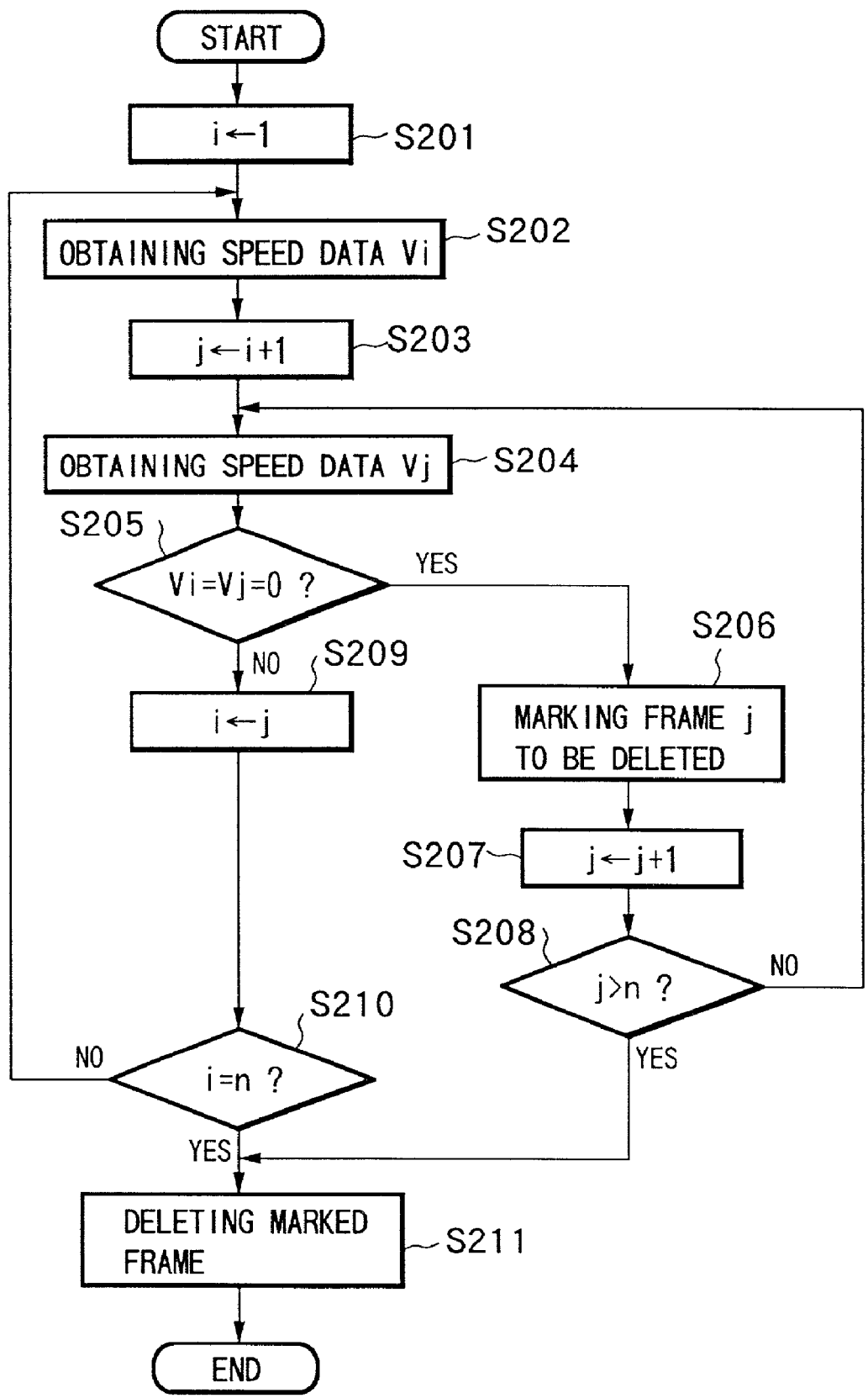
FIG. 11 is a flowchart of a thinning process according to a second embodiment of the present invention.

FIG. 11 is a flowchart of the thinning process according to the second embodiment. First, in step S201, i indicating the speed data to be checked is set to the initial value of 1. In step S202, the i-th speed data (that is, the speed data corresponding to the i-th time code) Vi is obtained from the image data storage unit 10. Furthermore, in step S203, j indicating the speed data to be compared with the speed data Vi is set to i+1, that is, the speed data Vj corresponding to the adjacent frame.

In step S204, the speed data Vj corresponding to the frame j is obtained from the image data storage unit 10, and it is checked in step S205 whether or not both Vi and Vj are zero. If they are 0 (Vi=Vj=0), then control is passed to step S206, and the speed data Vj or the j-th time code is marked to delete the frame j. Then, in step S207, 1 is added to j to check the speed data in the adjacent frame. If j is equal to or smaller than n in step S208, then control is returned to step S204.

In the frames consecutively containing 0 as the speed data, the camera stops moving for any reason. Therefore, a plurality of frames at the same position overlap each other. Therefore, in the above mentioned processes, overlapping frames are deleted by deleting all frames except the first frame. For example, when five consecutive frames (I1 through I5) contain speed data having zeros, I2 through I5 are assigned deletion marks. In step S208, when j is larger than n (number of frames to be processed), it means that all frames have been checked, thereby passing control to step S211.

If Vi=Vj=0 is not satisfied in step S205, then control is passed to step S209, an the value of i is substituted for j. Then, if i is not equal to n in step S210, control is returned to step S202. Thus, consecutive frames captured at the same position are detected from all of n frames, and overlapping frames can be assigned deletion marks.

Then, in step S211, all frames corresponding to the speed data or time codes provided with the deletion marks are deleted. Thus, overlapping image data captured at the same position can be removed from the sequence of frames obtained from all cameras.

As described above, according to the second embodiment, overlapping image data is detected and deleted based on the moving speed measured by the speedometer mounted on the moving object such as a vehicle, etc.

The present embodiment can be used with the configuration using the GPS data described by referring to the first embodiment. Since data may not be obtained using the GPS depending on the geographic conditions, etc., it is possible to perform the thinning process using the speed data when the GPS data cannot be obtained.

Furthermore, since the GPS data can contain errors, frames can be deleted in conjunction with the speed data to improve the precision in detecting overlapping frames. In this case, for example, frames can be deleted when they are determined to have been captured at the same position according to both GPS data and speed data.

[Third Embodiment]

Although the speed sensor is used in the second embodiment, it is also possible to mount a distance meter on a vehicle provided with a camera to record the distance covered in synchronization with the time code, detect a frame group having the same measurement data as the same group of frames captured at the same position, and delete the overlapping frames in the frame group.

In this case, when the distance measurement value of the frame i is set to Pi, and the distance measurement value of the frame j is set to Pj, the overlapping frames are detected and deleted in the process procedure similar to that of the first embodiment.

When the distance meter is used, it is determined whether or not the following expression is satisfied in step S105 as in the first embodiment.

$$|Pi-Pj|<\alpha$$

Based on the determination, frames can be regarded as the same frames when the difference between them is in a predetermined range although they do not exactly match each other. Since the distance measurement values are Pi and Pj according to the third embodiment, the difference in measurement value can be used in the expression above.

[Fourth Embodiment]

According to the fourth embodiment, the GPS data or the speed data is not used, but overlapping frames are detected from the contents of an adjacent frames, and then deleted.

Figure 12:
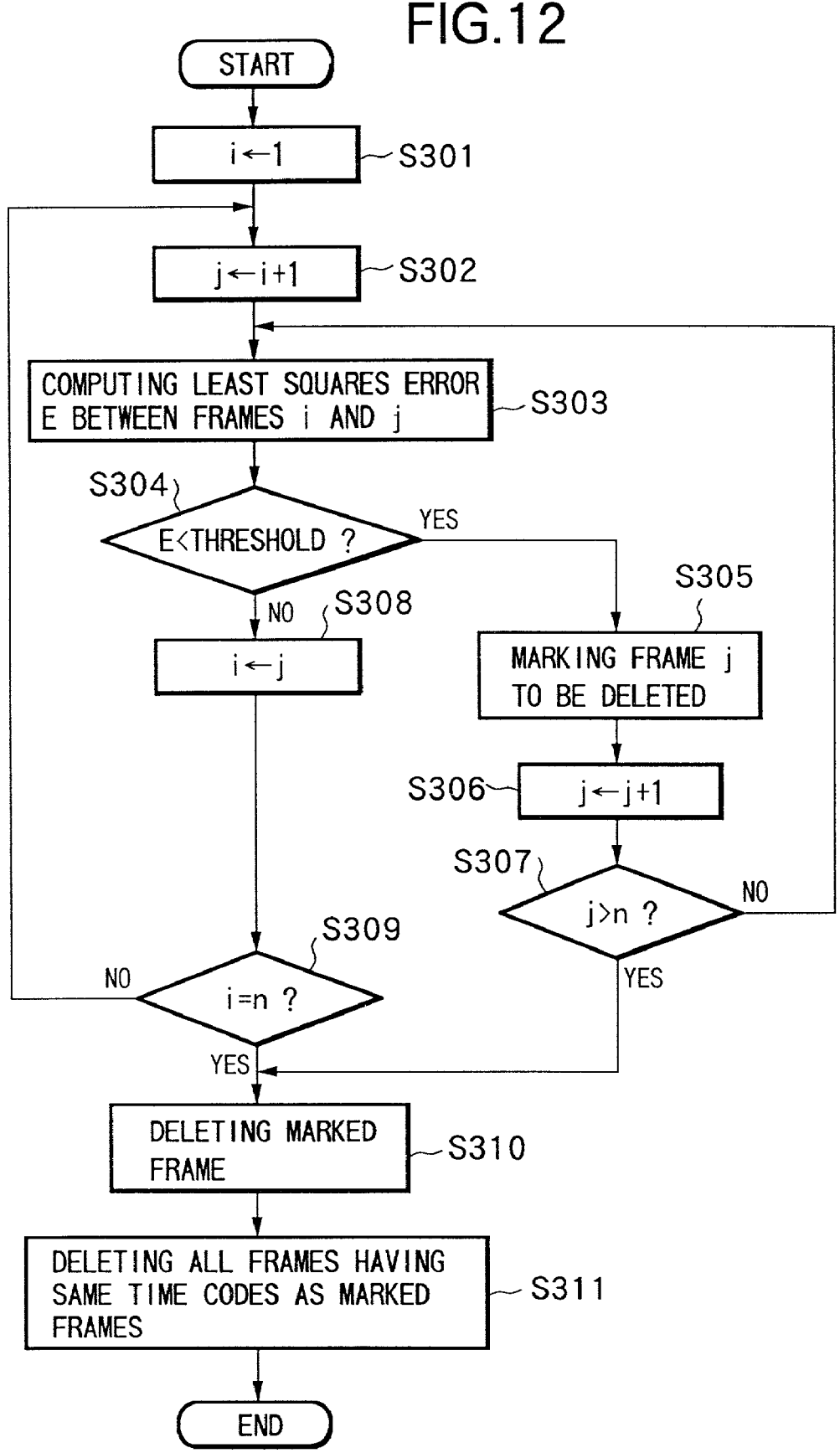
FIG. 12 is a flowchart of a thinning process according to a fourth embodiment of the present invention.

FIG. 12 is a flowchart of the thinning process according to the fourth embodiment. The following process is performed only on a sequence of frames obtained from one of a plurality of cameras of the image data collection system 90. First, in step S301, the value of i indicating the frame to be checked is set to the initial value of 1. Then, in step S302, the value of j indicating the frame to be compared with the frame i is set to i+1, that is, set as an adjacent image.

In step S303, the least squares error E between the images in the frames i and j is computed, and it is determined in step S304 whether or not the error E is smaller than a predetermined threshold. If the value of the error E is smaller than the threshold, then the frames i and j are determined to be the images captured at the same position, and the frame j is marked to be deleted from the corresponding image sequence in step S305. Then, in step S306, 1 is added to j to check the next frame, and control is returned to step S304 if j is equal to or smaller than n in step S307.

If the error E is equal to or larger than the threshold in step S304, then it is determined that the images in the frames i and j do not match each other (not the same images) Then, control is passed to step S308, and the value of i is substituted for the value of j. If i is not equal to n in step S309, then control is returned to step S302. Thus, all n frames are checked to detect consecutive frames captured at the same position, and overlapping frames are marked for deletion.

Then, in step S310, marked frames are deleted. In step S311, in the frame sequences captured by other cameras, the frames having the same frame numbers (or time codes) as the frames deleted in step S310 are deleted.

The frame according to the fourth embodiment contains an image obtained by one of n cameras shown in FIG. 3. When the camera is mounted on a vehicle, it is desired to make 90° from the forward direction because the presence of a movement easily appears on the screen.

According to the above mentioned embodiments, a frame is obtained from one camera, but the above mentioned processes can be performed on a plurality of frame sequences. For example, the processes shown in FIG. 10 can be performed on each of the two frame sequences obtained by two cameras facing right and left from the forward direction. When the deletion marks are provided for both right and left frames, the frames having the corresponding numbers are deleted. Thus, when only a small change is detected in the scene on one side of the view from a vehicle (for example, when the sea is captured) it can be correctly determined whether or not the frame is to be deleted.

[Fifth Embodiment]

According to the fourth embodiment, the least square error is used in determining whether or not images are the same as each other (steps S303, S304). However, to determine whether or not two images match each other is not necessarily performed by the above mentioned method. According to the fifth embodiment, the relative positions of two images are obtained based on the corresponding points between the images as an example of the procedure of determining whether or not the two images have been captured at the same position.

Figure 13:
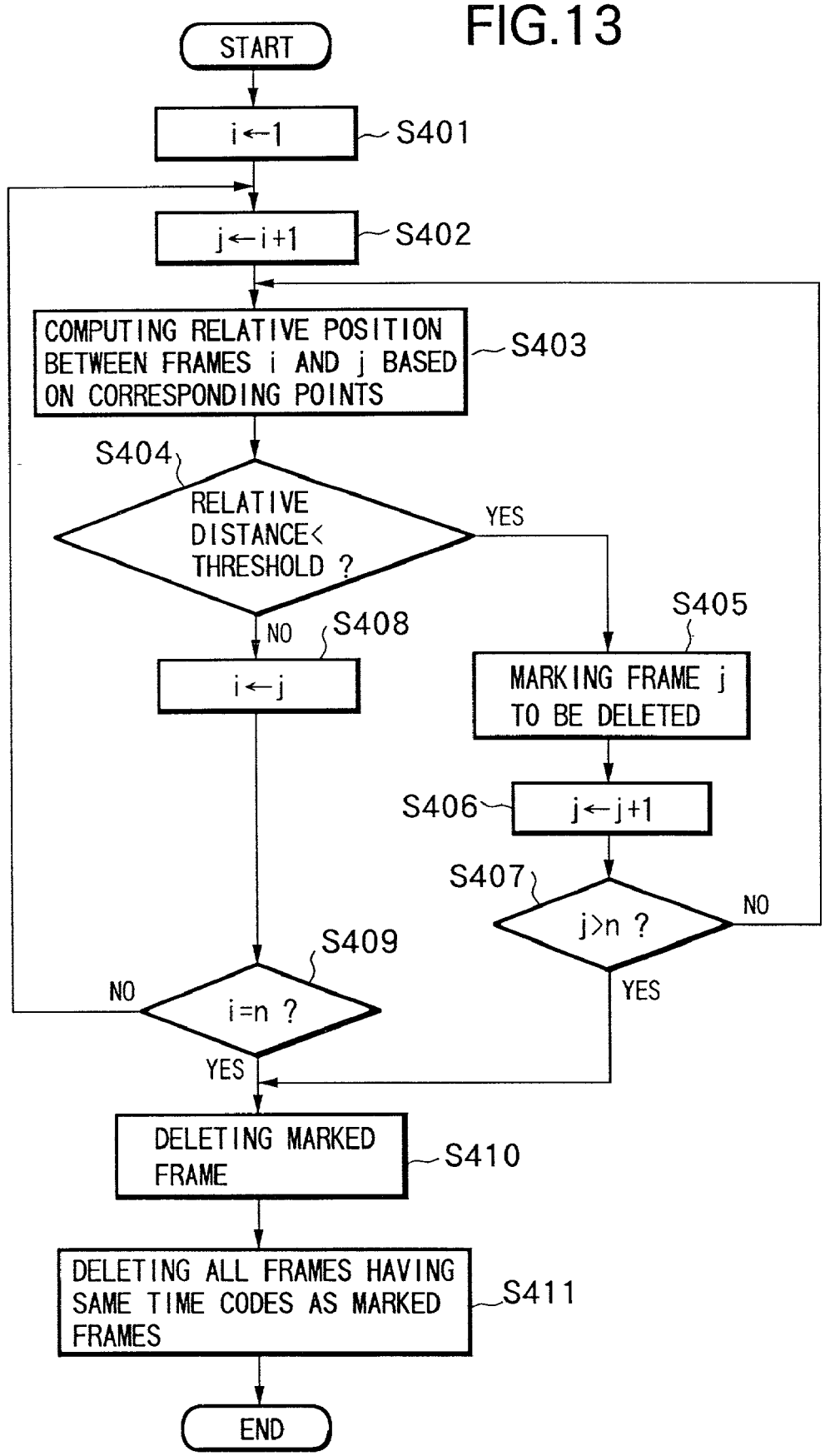
FIG. 13 is a flowchart of a thinning process according to a fifth embodiment of the present invention.

FIG. 13 is a flowchart of the thinning process according to the fifth embodiment. However, the following process is performed on a frame sequence obtained from one of a plurality of cameras of the image data collection system 90. First, in step S401, i indicating the frame to be checked is set to the initial value of 1. Then, in step S402, j indicating the frame to be compared with the frame i is set to i+1, that is, an adjacent image.

In step S403, the corresponding points are extracted from the images of the frames i and j, and the relative positions between the images are obtained from the extracted corresponding points. Since the processes of extracting the corresponding points from the images and computing the positions based on the corresponding points are well known by those skilled in the art, the detailed explanation is omitted here.

In step S404, the relative distance between the two images is obtained from the relative positions obtained in step S403, and it is determined whether or not the relative distance value is smaller than a predetermined threshold. When the distance value is smaller than the threshold, it is determined that the frames i and j contains the images captured at the same position, and the frame j is marked to be deleted from the image sequence in step S405. In step S406, 1 is added to j to check the next frame, and control is returned to step S404 if j is equal to or smaller than n in step S407.

If in step S404 the relative distance value is equal to or larger than the threshold, then the images in the frames i and j are not the same as each other (not the imaged captured at the same position), control is passed to step S408, and the value of i is substituted for j. If i is not equal to n in step S409, then control is returned to step S402. Thus, consecutive frames of images captured at the same position are detected in all n frames, and deletion marks can be provided for overlapping flames.

Then, in step S410, the marked frames are deleted. In step S411, the frames having the same frame numbers or time codes as the frames deleted in step S410 are deleted from the frame sequences obtained from other cameras.

[Sixth Embodiment]

According to the above mentioned first through fifth embodiments, the frames of the images captured at the same positions when the vehicle as a moving object stops running are detected and deleted, thereby removing overlapping frames to make the best of the resources and improve the process efficiency.

According to the sixth embodiment, frames are obtained at desired intervals in the real space, and stored in the associated data storage unit 50. This effect can be obtained by designing the α in the following expressions, by which it is determined whether or not the corresponding frame is to be deleted, to be freely set in the process in step S105 in the first and third embodiments.

$$f(Pi, Pj) < \alpha, \text{ or}$$

$$|Pi - Pj| < \alpha$$

With the above mentioned configuration, the intervals of the frames can be equally set to α approximately, thereby equally (the value equal to α approximately) setting the intervals of the panoramic images stored in the associated data storage unit 50 independent of the speed of the moving object at the time of collecting the image data. As a result, a database of panoramic images suitable for reproducing walk-through images can be obtained.

An example of the method of specifying the value of α can be setting a distance in the real space such as 50 cm, 1 m, etc. as desired frame intervals.

[Seventh Embodiment]

According to the first embodiment, frame data can be assigned using a sectional point and a road on the map without the GPS data. Furthermore, without the GPS data, as described above by referring to the second through fifth embodiments, overlapping video data obtained by stopping the moving object during the collection of image data can be deleted. However, although the above mentioned processes are performed, frames are loose or tight depending on the moving speed of the moving object, thereby detecting wasteful frames in the excessively tight portion.

In the sixth embodiment, wasteful frames are removed and frames are arranged at equal intervals according to the information (GPS data, a measurement value of a distance meter) about the position at which images are captured by the image data collection system 90. However, this method cannot be used for a system without GPS data or a distance meter. According to the seventh embodiment, unequal intervals of sampled frames can be absorbed when a system has no GPS data or distance meter. However, the data is associated with the map as described above by referring to FIG. 9.

Figure 14:
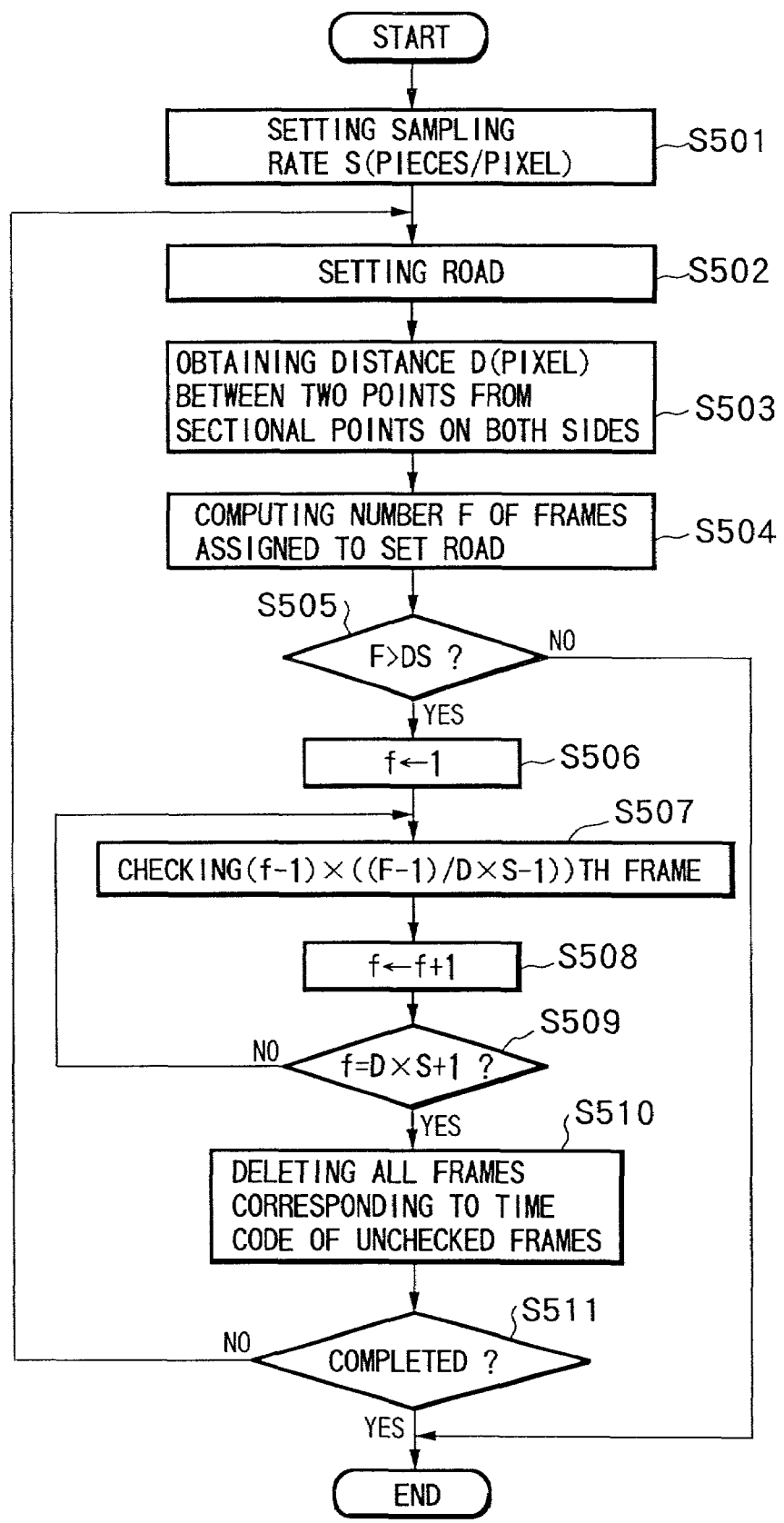
FIG. 14 is a flowchart of a thinning process according to a seventh embodiment of the present invention.

FIG. 14 is a flowchart of the process of thinning out the frames according to the seventh embodiment. Before performing the process, it is desired that overlapping frames are removed in the method described above by referring to the second, fourth, and fifth embodiments.

In step S501, a desired sampling rate S (pieces/pixel) is set. The sampling rate S refers to the number of frames per pixel of a map image. For example, if a frame is to contain 10 pixels, the inverse value 0.1 is set as a sampling rate S.

Then, in step S502, a desired road is specified, thereby specifying a frame group to be thinned out. A road can be specified by a pointing device with a map image displayed, or a road ID can be input from a keyboard, etc. When the road is specified, control is passed to step S503, the coordinates on the map image of the sectional points on both ends of the specified road are obtained, and the distance D (pixels) between the two sectional points can be obtained. In step S504, the number of frames of a frame group assigned as the specified road is obtained, and defined as F. For example, in the example shown in FIG. 9, there are n frames, and F equals n.

Based on the length (distance D) of the specified road and the set sampling rate S, the number of frames to be present for the specified road is determined to be DS. In the processes in steps S506 through S509, the images to be deleted are selected to set the number frames (F pieces) of the frame group corresponding to the specified road as D×S pieces. In this process, the number of frames F is assumed to be larger than D×S. Therefore, before performing the processes in and after step S506, it is determined whether or not F>D×S. If not, the process terminates.

Described below are the processes in and after step S506. In step S506, the variable f used as a counter is set to the initial value of 1. Then, in step S507, the ((f−1)×((F−1)/(D× S−1)))th frame is checked as a frame to be used. The value of (f−1)×((F−1)/(D×S−1)) is an integer obtained as an operation result. In step S508, 1 is added to f, and the processes in steps S506 and S507 are repeated until f equals (D×S+1) (target number of pieces) (step S509).

In the above mentioned processes, D×S pieces of checked frames can be obtained. In step S510, unchecked frames are removed, thereby thinning F frames corresponding to the specified road into D×S pieces of frames. When the processes are performed on other roads, control is returned from step S11 to step S501, thereby repeating the above mentioned processes. If data is not to be edited any more, the process terminates after performing the process in step S510.

As described above, according to the seventh embodiment, the number of pieces of panoramic images per unit distance (pixels) is set to perform the thinning process on the number of frames. Therefore, unequal intervals of sampled image data can be leveled. Furthermore, since the thinning process is performed on the frame group assigned to a road in the order of assigning the frames, the thinning process can be appropriately perform without GPS data, etc.

It is obvious that purpose of the present invention can also be attained by providing a storage medium (or a record medium) storing a program code of the software for realizing the functions of the above mentioned embodiments for a system or a device, and by a computer (or a CPU, MPU, etc.) of the system or the device reading and executing the program code stored in the storage medium. In this case, the program code itself read from the storage medium realizes the function of the above mentioned embodiments, and the storage medium storing the program code configures the present invention. In addition, when the computer executes the read program code, the functions of the above mentioned embodiments can be realized, a part or all of the actual processes can be performed by the operating system (OS), etc. operated in the computer, and the functions of the above mentioned embodiments can be realized by the processes.

Furthermore, after writing the program code read from the storage medium to the function extension card inserted to the computer or the memory in the function extension unit connected to the computer, the CPU, etc. in the function extension card or the function extension unit can perform a part or all of the actual process at an instruction of the program code, thereby realizing the functions of the above mentioned embodiments.

As described above, according to the present invention, panoramic images, etc. for reproduction of virtual space can be efficiently generated and held when the virtual space is designed in a walk-through system using the IBR technology.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for producing a virtual space for walk-through, said apparatus comprising:
   holding means for holding plural pieces of frame data constituting each of plural moving images captured using each of a plurality of capturing devices mounted on a moving object, associated with position data obtained based on GPS, that indicate a position at which each piece of frame data is captured;
   setting means for setting a sampling interval of frame data;
   extraction means for reading position data associated with successive frame data and extracting position data based on the sampling interval;
   deletion means for deleting frame data of the plurality of capturing devices that has been held in said holding means, and corresponds to the extracted position data except for one of said extracted position data;
   generation means for generating panoramic images from the frame data captured by the plurality of capturing devices; and
   associating means for associating each of the panoramic images with a position on a map based on the position data of frames constituting that panoramic image,
   wherein said extracted position data correspond to positions separated by a distance shorter than a distance corresponding to the set sampling interval.

2. An image processing method for producing a virtual space for walk-through, said method comprising the steps of:
   holding in a holding means plural pieces of frame data constituting each of plural moving images captured using each of a plurality of capturing devices mounted on a moving object, wherein said holding means stores each of the plural pieces of frame data associated with position data obtained based on GPS, that indicate a position at which each piece of frame data is captured;
   setting means for setting a sampling interval of frame data;
   reading position data associated with successive frame data and extracting position data based on the set sampling interval;
   deleting frame data of the plurality of capturing devices that has been held in the holding means and corresponds to the extracted position data except for one of said extracted position data;
   generating panoramic images from the frame data captured by the plurality of capturing devices; and
   associating each of the panoramic images with a position on a map based on the position data of frames constituting that panoramic image,
   wherein said extracted position data correspond to positions separated by a distance shorter than a distance corresponding to the set sampling interval.

3. A computer-executable program, stored on a computer readable medium, which makes a computer execute an image processing apparatus for producing a virtual space for walk-through, comprising:
   code for setting a sampling interval of frame data;
   code for reading position data associated with successive frame data and extracting position data based on the set sampling interval, from holding means which holds plural pieces of frame data constituting each of plural moving images captured using each of a plurality of capturing devices mounted on a moving object, associated with position data obtained based on GPS, that indicate a position at which each piece of frame data is captured;
   code for deleting frame data of the plurality of capturing devices that has been held in the holding means and corresponds to the extracted position data except for one of said extracted position data;
   code for generating panoramic images from the frame data captured by the plurality of capturing devices; and
   code for associating each of the panoramic images with a position on a map based on the position data of frames constituting that panoramic image,
   wherein said extracted position data corresponds to positions separated by a distance shorter than a distance corresponding to the set sampling interval.

4. A computer-readable storage medium storing a computer-executable program which makes a computer execute an image processing apparatus for producing a virtual space for walk-through, wherein said program comprises:
   a code for setting a sampling interval of frame data;
   a code of a reading step of reading position data associated with successive frame data and of an extracting step of extracting position data based on the set sampling interval, from holding means which holds plural pieces of frame data constituting each of a plurality of moving images captured by using each of a plurality of capturing devices mounted on a moving object, associated with position data obtained based on GPS, that indicate a position at which each piece of frame data is captured;

a code of a deleting step of deleting frame data of the plurality of capturing devices that has been held in the holding means, and corresponds to the extracted position data except for one of said extracted position data;

a code for a generating step of generating panoramic images from the frame data captured by the plurality of capturing devices; and a code of an associating step of associating each of the panoramic images with a position on a map based on the position data of frames constituting that panoramic image, wherein said extracted position data corresponds to positions separated by a distance shorter than a distance corresponding to the sampling interval.

* * * * *

UNITED STATES PATENT AND TRADEMARK OFFICE
CERTIFICATE OF CORRECTION

| | | |
|---|---|---|
| PATENT NO. | : 7,120,313 B2 | Page 1 of 2 |
| APPLICATION NO. | : 09/818605 | |
| DATED | : October 10, 2006 | |
| INVENTOR(S) | : Daisuke Kotake et al. | |

It is certified that error appears in the above-identified patent and that said Letters Patent is hereby corrected as shown below:

Title Page
    (56) Other Publications, "Building image-based..., etc", first occurrence, "image-based" should read --Image-based--, and "2997" should read --1997--.

Foreign Patent Documents, "JP 0 977 014" should read --EP 0 977 014--.

Col. 1, line 41, "above mentioned" should read --above-mentioned--.

Col. 2, lines 16, 21, and 36, "above mentioned" should read --above-mentioned--.

Col. 5, line 50, "above mentioned" should read --above-mentioned--.

Col. 6, lines 1, 4, 11 and 31, "above mentioned" should read --above-mentioned--.

Col. 6, lines 7, and 51, "above men-" should read --above-men--.

Col. 7, lines 6 and 54, "above mentioned" should read --above-mentioned--.

Col. 8, lines 14 and 39 "above mentioned" should read --above-mentioned--.

Col. 9, line 4, "above mentioned" should read --above-mentioned--.

Col. 9, line 33, "corresponding" should read --corresponding to--.

Col, 10, lines 39, 40 and 57, "above mentioned" should read --above-mentioned--.

Col. 11, line 18, "contains" should read --contain--.

Col. 11, line 25, "imaged" should read --images--.

Col. 11, line 32, "flames" should read --frames--.

Col. 11, lines 39 and 56, "above mentioned" should read --above-mentioned--.

Col. 12, lines, 8 and 62, "above mentioned" should read --above-mentioned--.

Col. 12, line 48, "number" should read --number of--.

Col. 12, line 67, "above men-" should read --above-men--.

UNITED STATES PATENT AND TRADEMARK OFFICE
CERTIFICATE OF CORRECTION

PATENT NO.         : 7,120,313 B2
APPLICATION NO. : 09/818605
DATED                : October 10, 2006
INVENTOR(S)       : Daisuke Kotake et al.

It is certified that error appears in the above-identified patent and that said Letters Patent is hereby corrected as shown below:

Col. 13, line 11, "perform" should read --performed--.

Col. 13, line 15, "above mentioned" should read --above-mentioned--.

Col. 13, lines 26 and 34, "above" should read --above--

Signed and Sealed this

Thirty-first Day of July, 2007

JON W. DUDAS
*Director of the United States Patent and Trademark Office*